United States Patent [19]

Riddle et al.

[11] 4,097,836
[45] Jun. 27, 1978

[54] DEPTH SOUND INDICATOR

[75] Inventors: Parvin Riddle, 2024 West St., Annapolis, Md. 21401; Christopher I. Reynolds, Walpole, Mass.

[73] Assignee: Parvin Riddle, Annapolis, Md.

[21] Appl. No.: 767,389

[22] Filed: Feb. 10, 1977

[51] Int. Cl.² .............................................. G01S 9/66
[52] U.S. Cl. .................................................. 340/3 C
[58] Field of Search ................ 340/3 C, 1 R, 3 R, 29, 340/104

[56] References Cited

U.S. PATENT DOCUMENTS

| | | | |
|---|---|---|---|
| 2,403,527 | 7/1946 | Hershberger | 340/1 R |
| 2,728,900 | 12/1955 | Ross | 340/3 R |
| 2,998,591 | 8/1961 | Lovett | 340/1 R |
| 3,223,965 | 12/1965 | Beebe | 340/3 R |
| 3,493,920 | 2/1970 | MacMunn | 340/1 R |
| 3,706,068 | 12/1972 | Bradshaw et al. | 340/3 R |

*Primary Examiner*—Richard A. Farley
*Attorney, Agent, or Firm*—Fidelman, Wolffe & Waldron

[57] ABSTRACT

An audible tone depth sounder indicator apparatus changes the repetition rate of its audio output to indicate deviation in actual water depth from a selected reference depth. A change in tone of the audible output distinguishes positive and negative deviations from the reference depth, and there is no audible signal when actual depth equals the selected reference depth.

12 Claims, 4 Drawing Figures

DEPTH SOUND INDICATOR

BACKGROUND OF THE INVENTION

The present invention relates generally to water depth sounders for nautical vessels and, more particularly, to an apparatus which presents a depth signal output in an audible format. Many of the prior art depth sounders present their depth indications as a dial indicator readont, a digital display or on a cathode ray tube display. Such devices require that the operator visually observe, attend, and read the instrument. On small vessels with a sole operator or only a small crew, reading of the depth sounder distracts and diverts the operator's skills from other navigational tasks which require constant attention. This is especially true near the shoreline, among rocks and reefs, and when navigating narrow channels.

Therefore, what is needed is an apparatus to present water depth sounding data to the vessel's operator in a format which provides the greatest significance and yet causes little, if any, intrusion on the operator's other ongoing navigational activities.

SUMMARY OF THE INVENTION

The apparatus of the present invention uses the signal from electronic depth sounding gear, e.g., sonar, as an input signal and compares this actual depth signal with a reference signal generated within the apparatus. The reference signal is chosen by the operator and represents a selected water depth which may have significance, such as for example, the boat's draft plus ten feet of water, or the depth of a marked channel. When the actual depth of water corresponds to the selected reference depth; that is, they are equal, then the apparatus of this invention provides no output thereby indicating a parity between signals. When the actual water depth signal deviates from the reference depth signal, the apparatus provides an audible output thereby informing the operator without requiring his visual or manual attention. One tone of audible output indicates actual water depth in excess of the reference level; another tone indicates a water depth less than the reference level. The repetition rate of the audible signal indicates directly the deviation from the reference level regardless of whether the deviation is a measure of depth above or below the reference level.

OBJECTS OF THE INVENTION

An object of the present invention is to provide a water depth indication in audible format which informs the operator.

Another object of the present invention is to indicate water depth as a deviation from a preselected reference depth.

A further object of the present invention is to provide a two-tone audible signal thereby indicating whether actual depth exceeds or is less than the reference depth.

Yet another object of the present invention is to provide an audible signal which repeats at a rate which directly reflects the deviation of the actual water depth from the reference depth.

Still another object is to provide no signal when the actual water depth equals a preselected reference depth.

Other objects, advantages, and novel features of the present invention will become apparent from the following detailed description of the invention when considered in conjunction with the accompanying drawing in which.

Figure 1:
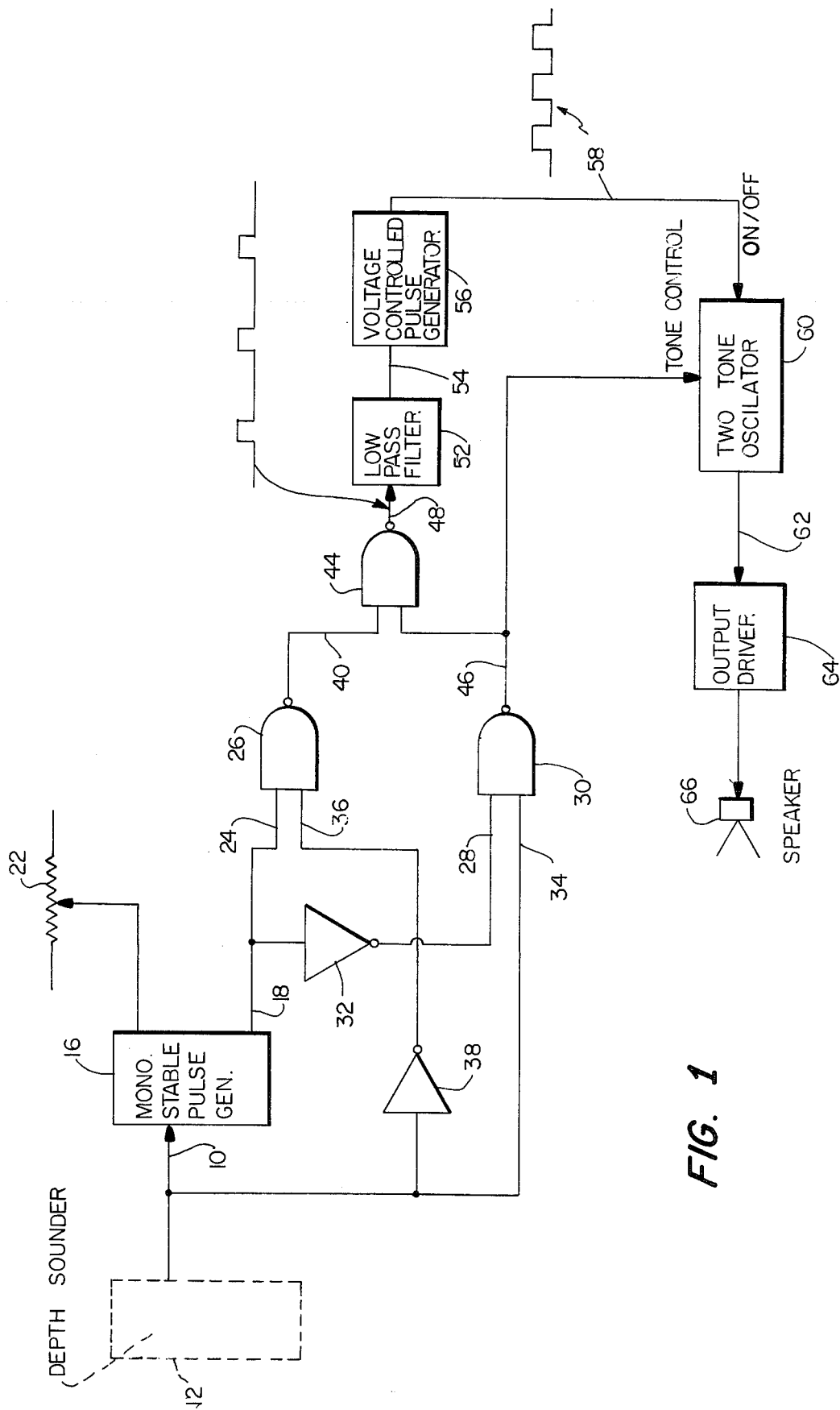
FIG. 1 is a functional diagram of the electronic circuits of the depth sounder indicator of this invention.
Figure 2:
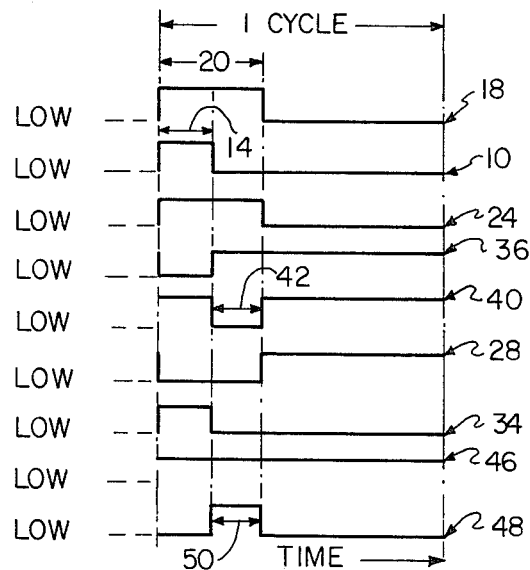
FIG. 2 is an electrical timing diagram illustrating electrical waveforms for one cycle of operation at points in the circuit of FIG. 1 when actual water depth is less than a selected reference depth.

With reference to FIGS. 1 and 2, a depth sounding signal 10 enters the circuit on the input line. This signal 10 is provided by conventional depth sounding gear 12, e.g., sonar. The techniques of transmitting pulsed energy from a vessel downward through the water to the bottom surface and measuring the elapsed time between transmission of energy and reception of echoes from the bottom are well known, form no novel part of the subject invention and, therefore, are not discussed herein.

The incoming water depth signal 10 is in the form of a pulse, the width 14 of the pulse 10 being representative of the actual water depth. Thus, a signal 10 of longer duration is inputted as the water depth increases. The input signal 10 triggers off the monostable pulse generator 16 which goes high and produces at its output a pulse waveform 18 similar in shape to the input waveform 10. The duration 20 or width of the output pulse 18 from the monostable pulse generator 16 is determined by the setting on a variable resistor represented schematically in FIG. 1 by number 22, within the pulse generator 16, and is set by the operator. The duration 20 of this pulse output 18 can be set to represent a wide range of water depths. Thus, the output 18 of the monostable pulse generator remains high until it has generated a signal whose duration 20 is representative of the operator's selected reference depth, i.e., for an actual water depth which equals the selected reference depth, the input signal 10 and the output signal 18 from the monostable pulse generator 16 will have equal durations 14, 20 and synchronized leading edges. Variable width pulse generators are well known, for example, Texas Instruments No. 54121.

Figure 4:
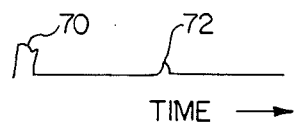
FIG. 4 is a diagram indicating the timed relationship of an output pulse from a depth finder apparatus and a returning echo pulse.

Also, it will be apparent to those skilled in the art that where the depth sounding gear provides (FIG. 4) only an echo pulse 72 at its output, an intermediate circuit device can be readily provided which produces an elongated pulse, as described, having a duration corresponding to the time delay between an output pulse 70 and the returning echo pulse 72.

FIG. 2 is indicative of the circuit conditions wherein the incoming water depth signal 10 is of lesser duration 14 than the internally generated reference signal 20; that is, the actual water depth is shallower than the reference depth setting on the monostable pulse generator 16. Describing this condition (FIG. 2), it is seen that the output reference signal 18 of the reference pulse generator 16 is inputted directly to one input 24 of the first NAND gate 26 and invertedly to one input 28 of the second NAND gate 30 via the first invertor 32.

The actual depth sounding signal 10, e.g., from sonar gear, is inputted directly to the second input 34 of the second NAND gate 30 and is inputted invertedly to the second input 36 of the first NAND gate 26 via the second inverter 38.

The output 40 of the first NAND gate 26 is low only during that time period when both its inputs 24, 36 are high. Thus, this output 40 is a notch having a width 42 equalling the difference in durations 14, 20 of the actual depth signal 10 and the reference signal 18. This output signal 40 of the first gate 26 is one input to the third NAND gate 44.

The output 46 of the second NAND gate 30 remains high during the entire cycle time period because its inputs 28, 34 are never high simultaneously. The output 46 of the second NAND gate 30 is the second input to the third NAND gate 44.

The output 48 of the third NAND gate 44 is low so long as both of its inputs 40, 46 are high. Thus, the output 48 of the third NAND gate 44 is a deviation signal pulse of fixed amplitude whose width 50 represents the difference in time duration between the actual water depth signal and the internally generated reference depth signal. It can be seen that the NAND gates 26, 30, 44 and inverters 32, 38 operate as a subtractor of the two incoming signals 10, 18 with the output 48 being the remainder of the longer signal less the shorter signal. It will be evident in examining FIG. 2 that the width 50 of the output pulse 48 is reduced to zero when the reference signal 18 and actual depth signal 10 are equal in duration.

It should be understood that the actual depth signal inputs 10 recur at substantially regular intervals, the repetition rate being determined by the depth sounding gear 12. Thus, the output 48 of the third NAND gate is a series of fixed amplitude pulses at a frequency equalling the repetition rate of the depth sounding gear 12.

These deviation signal pulses 48 are passed through the low pass filter 52 to remove extraneous higher frequency electrical noise which may be riding on the signal. The filtered output 54 is inputted to the voltage controlled pulse generator 56. This voltage-controlled generator 56 outputs a series of substantially constant width and constant amplitude pulses 58 having a frequency of occurrence which varies in direct relationship with the DC value of the input signal 54 to the generator. Thus, large deviations in duration between the selected reference depth signal 18 and the actual water depth signal 10 produce wide pulses 48 and a relatively high DC level at the input 54 to the voltage-controlled pulse generator 56 and a resultant high frequency of occurrence of pulses 58 at the generator output.

The output pulses 58 act as a switch actuator to alternately turn on and off an audio oscillator 60 whose output 62 is amplified 64 to drive a loudspeaker 66, or earphones (not shown), in the conventional manner.

Thus audible beeps of one tone and duration are repeated at a rate indicative of the depth deviation where, in the example described above, the actual water depth is less than the preselected reference depth.

Figure 3:
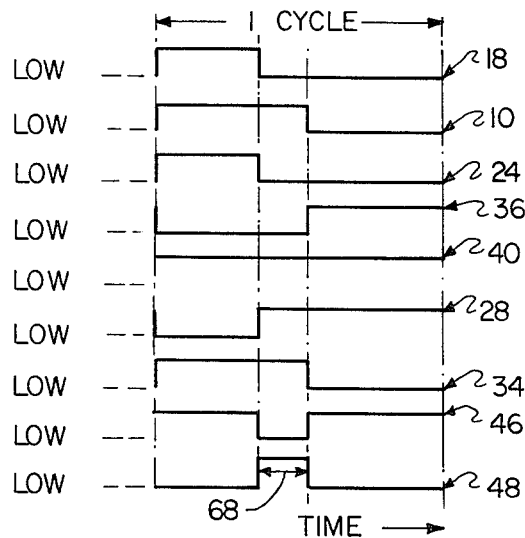
FIG. 3 is an electrical timing diagram illustrating electrical waveforms for one cycle of operation at points in the circuit of FIG. 1 when actual water depth is greater than a selected reference depth.

FIG. 3 is indicative of the circuit conditions wherein the incoming signal 10 is of greater duration than the internally generated reference signal 18; that is, the actual water depth is greater than the reference depth setting on the monostable pulse generator 16. The logic of the circuits FIG. 1 applies in a like manner in this example of greater depth. A reference depth signal 18 is triggered internally by the incoming actual water depth signal 10 and the three NAND gates 26, 30, 44 subtract the shorter duration signal 18 from the longer duration signal 10 to produce a pulse at the output 48 of the third NAND gate 44. This pulse 48 represents in its width 68 the deviation in duration between the externally derived and the internally derived signals 10, 18. It should be noted that the width 68 of the output signal 48 is directly related to this deviation in such a manner that the pulse width 68 is reduced to zero when the actual and reference depth signal durations are equal and deviation is zero.

As stated above, the deviaton output 48 of the third NAND gate 44 is filtered 52 to remove higher frequency noise and is used to control the rate of output of the voltage-controlled pulse generator 56. These pulses 58 from the pulse generator 56 alternately turn the audio oscillator 60 on and off and produce output beeps from the loudspeaker 66 at a rate directly representative of the deviation signal. It should be noted that the deviation signal 48 out of the third gate 44 is of the same polarity regardless of whether the water is deeper or shallower than the reference depth. Also, for equal depth deviations from the reference depth, regardless of whether the water is deeper or shallow than the reference depth, the width of the output 48 from the third gate 44 is equal. As a consequence, the repetition rate of the audible beeps from the speaker 66 is equal for equal deviations regardless of whether the actual water depth is more or less than the reference depth.

However, in comparing the output 46 from the second NAND gate 30 (FIGS. 2, 3), it is seen that this output 46 is continuously high (FIG. 2) when the actual water depth is less than the reference depth whereas there is a low notch (FIG. 3) in the output 46 when the actual water depth is greater than the reference depth. The output 46 of the second NAND gate 30 is fed to a tone control in the audio oscillator 60 causing the oscillator 60 to have one tone when actual water depth is shallower than the reference depth and another distinct tone when the water is deeper than the reference depth. In this way, the repetition rate of the audible beeps indicates magnitude of deviation from the reference depth and the tone indicates whether the water is deeper or more shallow than the selected reference depth.

From the preceding description of an embodiment of this invention, it is shown that the objects are attained; however, it should be understood that the spirit and scope of this invention are not limited to the embodiment described above. For example, in an alternative embodiment of this invention, the tone control may continuously vary the tonal frequency of the audible signal in response to changes in deviation rather than the two-tone apparatus described above. With such an arrangement, for example, the tone of the output could be permitted to go beyond the audible range when the water is very deep. And in another alternative, embodiment of the apparatus of this invention, the voltage-controlled pulse generator 56 may have a threshold bias which prevents any output 58 until the input signal 54 exceeds a predetermined level. This will produce a null zone for small deviations on either side of the reference depth in which no audible output is produced as compared to the apparatus described above wherein an audible output is produced except when there is no deviation. The width of the null zone may be varied by the operator. This feature eliminates frequent reversals in tonal quality which may be annoying to personnel where there are small but continuing depth variations about the reference depth. The width of the null zone would necessarily be made small when the water is shallow or hazardous and wider when there is little risk attendant on the selected range of depth variations which will produce no output signal.

Also in another embodiment of this invention, the output 46 from the second gate 30, which controls the two-tone oscillator operation as described above, may be used at the operator's election to turn the oscillator off continuously whenever the actual water depth is greater than the reference depth. Or in another embodiment, the oscillator 60 may be turned continuously off whenever the actual water depth exceeds the reference depth by a margin of safety selected by the operator. This on-off operation may be controlled by the output 46 of the second gate 30 as aforesaid or by the output 46 in combination with a switch responsive to the repetition rate of pulses from the pulse generator 56. Thus, the combination of a deep-water tone signal and a high beep rate, indicative of a selected deviation from the reference depth, would cut off the audible output. Therefore, unnecessary annoyance from audible beeps is eliminated when in safe waters.

In still another alternative embodiment, the audible indication may be replaced or supplemented by colored lights which flash on and off at a repetition rate indicating depth deviation and employing different light colors to distinguish depths greater or less than the reference depth.

It will also be apparent to those skilled in the art that the depth intelligence of the incoming signal may be contained in many variables other than duration of the pulse as described above. For example, amplitude of a signal may indicate water depth, or for another example, the signal may be AC wherein the frequency of the signal indicates depth. In every case, the internal reference signal will be generated in a format suited for direct comparison to the incoming depth signal, or the incoming signal will be converted to be compatible with the reference signal. The result of the comparison, as before, will be a signal indicative of the deviation between the actual water depth and the selected reference depth. Such apparatuses are considered to be within the scope of the instant invention.

What is claimed:

1. A water depth sounder indicating apparatus, said apparatus receiving at periodic intervals a constant amplitude water depth signal from a depth sounding device, the duration of said water depth signal having a direct relationship to the depth of water being measured by said depth sounding device, comprising:
    a reference signal generator, said reference signal generator outputting a constant amplitude reference signal whose duration corresponds to a selected depth of water;
    means for comparing the durations of said reference signal and said water depth signal; and
    an output device producing an output signal when the durations of said water depth signal and said reference signal are unequal and producing no audible signal when said durations are equal.

2. The water depth sounder indicating apparatus of claim 1 further comprising:
    means for alternately turning on and off said output signal of said output device; and
    means for varying the rate of said alternately turning on and off, said rate being in direct relation to the magnitude of difference in durations between said water depth signal and said reference signal.

3. The water depth sounder indicating apparatus of claim 1 further comprising:
    altering means, said altering means causing a first quality of output signal when the duration of said reference signal exceeds the duration of said water depth signal, and causing a second quality of output signal when the duration of said water depth signal exceeds the duration of said reference signal, said first and second qualities being readily distinguishable one from the other.

4. The water depth sounder indicating apparatus of claim 3 wherein said output signal is audible and said first quality is a first tone, and said second quality is a second tone.

5. The water depth sounder indicating apparatus of claim 3 wherein said output signal is visible light and said first quality is a first color and said second quality is a second color.

6. The water depth sounder indicating apparatus of claim 1 wherein the duration of said reference signal is variable by the operator of said apparatus of this invention.

7. The water depth sounder indicating apparatus of claim 1 wherein:
    said reference signal generator is triggered and synchronized by said water depth signal;
    said means for comparing includes: a first and second NAND logic gate, said first gate receiving directly said reference signal at one input and said water depth signal inverted at a second input, said second gate receiving directly said water depth signal at one input and said reference signal inverted at a second input; a third NAND logic gate receiving at its inputs the outputs of said first and second gates, one of said outputs at each of said inputs; and
    said output device includes: a pulse generator, said pulse generator receiving at its input the output of said third logic gate, and said pulse generator outputting pulses at a rate proportionate to the average DC amplitude of said input from said third logic gate; an oscillator, said oscillator being turned on and off alternately by said pulses from said pulse generator; and a loudspeaker operated by the output of said oscillator.

8. The apparatus of claim 7 wherein the frequency of said oscillator is controllable, said control being provided by the output of said second logic gate.

9. The apparatus of claim 7 wherein said oscillator operates at either of two frequencies, the first frequency being produced when the duration of said depth signal exceeds the duration of said reference signal, and the second frequency being produced when the duration of said reference signal exceeds the duration of said depth signal.

10. The apparatus of claim 1 wherein said output device is biased to inhibit the output unless said difference in said durations exceeds a threshold magnitude, whereby a null band is provided for small differences in duration.

11. The apparatus of claim 1 wherein said output device ceases outputting when said duration of said water depth signal exceeds said duration of said reference signal.

12. The apparatus of claim 1 wherein said output device ceases outputting when said duration of said water depth signal exceeds said duration of said reference signal by an amount of time representative of a selected depth differential.

* * * * *